(12) United States Patent
Toyama et al.

(10) Patent No.: US 7,492,375 B2
(45) Date of Patent: Feb. 17, 2009

(54) HIGH DYNAMIC RANGE IMAGE VIEWING ON LOW DYNAMIC RANGE DISPLAYS

(75) Inventors: Kentaro Toyama, Redmond, WA (US); Matthew Uyttendaele, Seattle, WA (US); William M. Crow, Sequim, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/713,539

(22) Filed: Nov. 14, 2003

(65) Prior Publication Data

US 2005/0104900 A1    May 19, 2005

(51) Int. Cl.
    *G09G 5/00*    (2006.01)
(52) U.S. Cl. .................... 345/629; 345/605; 345/640; 345/641
(58) Field of Classification Search ......... 345/629–641, 345/605
    See application file for complete search history.

(56) References Cited

U.S. PATENT DOCUMENTS

| | | | |
|---|---|---|---|
| 4,800,379 A | | 1/1989 | Yeomans |
| 5,479,603 A | | 12/1995 | Stone et al. |
| 5,652,851 A | | 7/1997 | Stone et al. |
| 5,818,455 A | | 10/1998 | Stone et al. |
| 5,818,975 A | * | 10/1998 | Goodwin et al. ............. 382/274 |
| 6,069,979 A | * | 5/2000 | VanMetter ................... 382/260 |
| 6,219,459 B1 | * | 4/2001 | Kurashige ................... 382/266 |
| 6,424,287 B1 | * | 7/2002 | Doerry et al. ............. 342/25 R |
| 6,546,144 B1 | * | 4/2003 | Fukuhara et al. ............. 382/240 |
| 6,559,846 B1 | | 5/2003 | Uyttendaele et al. |
| 6,597,468 B1 | * | 7/2003 | Inuiya ....................... 358/1.15 |
| 6,753,876 B2 | | 6/2004 | Brooksby et al. |
| 6,770,879 B1 | * | 8/2004 | Azordegan et al. .......... 250/310 |
| 6,879,731 B2 | | 4/2005 | Kang et al. |
| 6,888,552 B2 | * | 5/2005 | Debevec et al. ............. 345/589 |
| 7,010,174 B2 | * | 3/2006 | Kang et al. ................. 382/274 |

(Continued)

FOREIGN PATENT DOCUMENTS

EP          93308763.7          6/1994

OTHER PUBLICATIONS

Siprut, Mark. "Adobe Photoshop Handbook, Photoshop 3 Edition." Random House Publishers, New York, 1993.*

(Continued)

*Primary Examiner*—Kimbinh T Nguyen
(74) *Attorney, Agent, or Firm*—Klarquist Sparkman LLP

(57) ABSTRACT

Techniques and tools for displaying/viewing HDR images are described. In one aspect, a background image constructed from HDR image information is displayed along with portions of the HDR image corresponding to one or more regions of interest. The portions have at least one display parameter (e.g., a tone mapping parameter) that differs from a corresponding display parameter for the background image. Regions of interest and display parameters can be determined by a user (e.g., via a GUI). In another aspect, an intermediate image is determined based on image data corresponding to one or more regions of interest of the HDR image. The intermediate image has a narrower dynamic range than the HDR image. The intermediate image or a derived image is then displayed. The techniques and tools can be used to compare, for example, different tone mappings, compression methods, or color spaces in the background and regions of interest.

5 Claims, 6 Drawing Sheets
(2 of 6 Drawing Sheet(s) Filed in Color)

U.S. PATENT DOCUMENTS

| | | | |
|---|---|---|---|
| 7,146,059 | B1 | 12/2006 | Durand et al. |
| 2002/0154144 | A1* | 10/2002 | Lofgren et al. ............... 345/634 |
| 2002/0154693 | A1* | 10/2002 | Demos et al. .......... 375/240.03 |
| 2002/0158887 | A1* | 10/2002 | Samra et al. ................. 345/619 |
| 2003/0103670 | A1 | 6/2003 | Schoelkopf et al. |
| 2003/0133595 | A1* | 7/2003 | Farmer et al. ............... 382/103 |
| 2003/0142126 | A1* | 7/2003 | Estrada et al. .............. 345/738 |
| 2003/0202589 | A1* | 10/2003 | Reitmeier et al. ...... 375/240.12 |
| 2004/0042679 | A1* | 3/2004 | Yamada ...................... 382/260 |
| 2004/0125124 | A1* | 7/2004 | Kim et al. ................... 345/716 |
| 2004/0184059 | A1* | 9/2004 | Chun et al. ................ 358/1.13 |
| 2005/0185055 | A1* | 8/2005 | Miller et al. ............. 348/207.1 |

OTHER PUBLICATIONS

HDRView software. Published on the web Apr. 11, 2000, cited by applicant in specification. Available at: http://athens.ict.usc.edu/FiatLux/hdrview.*

Jyrinki, Timo. "High Dynamic Range images", published Jul. 4, 2003 on the web at. www.tml.hut.fi/Opinnot/Tik-111.500/2003/paperit/TimoJyrinki.pdf.*

P. Debevec and J. Malik. "Recovering High Dynamic Range Radiance Maps from Photographs". Proc. 24th Ann. Conf. on Comp. Graphics and Interative Techniques, pp. 369-378, 1997.*

F. Durand and J. Dorsey. "Fast Bilateral Filtering for the Display of High-Dynamic-Range Images." Proc. 29th Ann. Conf. on Comp. Graphics and Interactive Tech, pp. 257-266, 2002.*

Tchou et al., "HDRView, Version 1.2," 2 pp. (Apr. 11, 2000) [downloaded from the World Wide Web on Oct. 17, 2003].

Ashikhmin, "A Tone Mapping Algorithm for High Contrast Images," *Eurographics Workshop on Rendering*, pp. 1-11 (Jun. 2002).

Robertson et al., "Dynamic Range Improvement Through Multiple Exposures," *Int'l Conf. on Image Processing*, Kobe, Japan, 5 pp. (Oct. 1999).

Moghaddam et al., "Defining Image Content with Multiple Regions-of-Interest," *Proc. IEEE Workshop on Content-Based Access of Image and Video Libraries*, 5 pp. (Jun. 1999).

Tian et al., "Combine User Defined Region-of-Interest and Spatial Layout for Image Retrieval," *Proc. IEEE Int'l Conf. on Image Processing (ICIP 2000)*, pp. 746-749 (Sep. 2000).

Scheel et al., "Tone Reproduction for Interactive Walkthroughs," *Eurographics 2000*, vol. 19, No. 3, 12 pp. (Aug. 2000).

Stone et al., "The Movable Filter as a User Interface Tool," *Proceedings of CHI94*, Boston, pp. 306-312 (Apr. 1994).

Debevec et al., "Recovering High Dynamic Range Radiance Maps from Photographs," *Proc. 24th Annual Conf. Computer Graphics & Interactive Techniques (SIGGRAPH '97)* 10 pp. (Aug. 1997).

Duiker et al., "MakeHDR," 2 pp. (1999) [downloaded from the World Wide Web on Oct. 21, 2003].

Regents of the University of California, "Readme and Answers to anticipated FAQs," 3 pp. (Aug. 1999) [downloaded from the World Wide Web on Oct. 21, 2003].

Industrial Light & Magic, "OpenEXR: About OpenEXR," 2 pp. [downloaded from the World Wide Web on Oct. 17, 2003].

Industrial Light & Magic, "OpenEXR: Using EXRdisplay," 2 pp. [downloaded from the World Wide Web on Oct. 17, 2003].

Industrial Light & Magic, "OpenEXR: The OpenEXR File Format," [downloaded from the World Wide Web on Oct. 17, 2003].

"HDR Shop: Getting Started," 3 pp. [downloaded from the World Wide Web on Oct. 17, 2003].

Microsoft Corp., "How to Use Filters," 2 pp. (downloaded from the World Wide Web on Apr. 3, 2003).

Fattal et al., "Gradient Domain High Dynamic Range Compression", *ACM SIGGRAPH 2002*, 8 pp. (2002).

Mann, "Comparametric Equations with Practical Applications in Quantigraphic Image Processing", *IEEE Transactions on Image Processing*, vol. 9, No. 8, pp. 1389-1405 (Aug. 2000).

"Filtering and Enhancing Images", *Computer Vision*, pp. 145-150 (Mar. 2000).

Larson, "Overcoming Gamut and Dynamic Range Limitations in Digital Images," *Color Imaging Conference*, 6 pp. Scottsdale, Arizona (1998).

Mantiuk et al., "Perception-Motivated High Dynamic Range Video Encoding," *ACM Trans. Graphics*, vol. 23, No. 3, pp. 733-741 (2004).

"The Magic Lens Interface Project," 1 p. (document dated Sep. 16, 1998) [downloaded from the World Wide Web on Mar. 10, 2006].

Xerox Corp., "Magic Lens Demo," 2 pp. (document dated 1996) [downloaded from the World Wide Web on Mar. 10, 2006].

Xu et al., "High-Dynamic-Range Still-Image Encoding in JPEG 2000," *IEEE Computer Graphics & Applications*, pp. 57-64 (Nov./Dec. 2005).

Ward et al., "Subband Encoding of High Dynamic Range Imagery," *Proceedings of the 1st Symposium on Applied Perception in Graphics and Visualization*, pp. 83-90 (2004).

Industrial Light & Magic, "Industrial Light & Magic Releases Proprietary Extended Dynamic Range Image File Format OpenEXR to Open Source Community," 1 p. (Jan. 2003).

Tchou et al., Screenshot #1, #2 from "HDRView v.1.2," Apr. 11, 2000, 2 pages.

* cited by examiner

Software 180 with HDR Image Viewer

RECTANGLE VIEWER

SPLIT-PANE
VIEWER

HIGH DYNAMIC RANGE IMAGE VIEWING ON LOW DYNAMIC RANGE DISPLAYS

RELATED APPLICATION INFORMATION

This application relates to U.S. patent application Ser. No. 10/012,001 entitled "Interactive Images," filed Nov. 30, 2001, which is hereby incorporated herein by reference.

COLOR DRAWINGS

The file of this patent application contains at least one drawing/photograph executed in color. Copies of this patent with color drawing(s)/photograph(s) will be provided by the Office upon request and payment of the necessary fee.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates to processing and viewing digital images, and more particularly relates to viewing high dynamic range images on low dynamic range display devices.

BACKGROUND

High dynamic range (HDR) images are images with a dynamic range that is more expansive than that of standard image formats. Typically, more image data can be encoded in HDR images than in images with lower (i.e., narrower) dynamic ranges. For example, an HDR image can allow for a greater range of dark and light values than a lower dynamic range image.

At present, most digital images are stored with a maximum of 8 bits per color channel (8 bpc). For example, in an 8 bpc digital image with red, green and blue color channels, 256 different values are possible for each of the red, green and blue values per pixel. Other values (e.g., alpha or opacity values, exposure values, etc.) also may be constrained by low dynamic range limitations. HDR images, on the other hand, provide more than 8 bpc. For example, some digital cameras have the ability to capture 12 bpc images. 16 bpc images and 32 bpc images are examples of likely possibilities in the near future. (HDR images also can be constructed from a collection of lower dynamic range images. See, e.g., Debevec et al., "Recovering High Dynamic Range Radiance Maps from Photographs," *SIGGRAPH '97* (August 1997).)

The range of possible color values in an 8 bpc image is narrower than the typical range of human visual perception. Thus, HDR images allow representation of a greater range of visual information that human beings can perceive. However, the vast majority of currently existing computer monitors are 8 bpc displays. So, if a digital image contains more than 8 bpc, a typical display is unable to take full advantage of this information. Although it is possible, using data compression techniques, to compress HDR images into lower dynamic range images, such techniques cause loss of image data. Most users, therefore, are currently unable to appreciate the value of HDR images.

Various prior techniques have addressed the problem of displaying more information for a displayed item than would ordinarily be visible on the display.

In Stone et al, "The Movable Filter as a User Interface Tool," *Proceedings of CHI94*, pp. 306-312 (April 1994), the authors describe a user interface tool that combines an arbitrarily-shaped region with an operator that changes the view of objects viewed through that region. For example, a filter can be moved over a city map to reveal details of the map.

U.S. Pat. No. 4,800,379 describes selecting an area (such as a circle or square) of a "digitising table." When a magnification option is selected, a magnified portion is displayed within the selected area.

U.S. patent application Ser. No. 10/012,001 describes an "interactive image" where each pixel location in the interactive image is assigned to one of several representative images having different characteristics. In a case where a desired interactive effect is to display a representative image having a "best" exposure or focus for a selected pixel location, image processing techniques are employed to determine which one of the several representative images represents the best exposure level or focus setting in connection with the selected pixel location. The one representative image can then be displayed.

A publicly available application known as HDRView allows a user to open an HDR image on a lower dynamic range display and shift-click on a selected pixel location in an HDR image to vary the exposure of the image in accordance with the exposure level at the selected pixel location. (A description of HDRView is available at http://athens.ict.usc.edu/FiatLux/hdrview/.)

Whatever the benefits of previous techniques, they do not have the advantages of the techniques and tools presented below.

SUMMARY

In summary, the detailed description is directed to various techniques and tools for displaying/viewing HDR images on standard, lower dynamic range displays. Described techniques and tools allow a user to subjectively experience the richness of an HDR image on a lower dynamic range display. Techniques and tools designed for displaying/viewing HDR images on lower dynamic range displays are valuable for generating more enthusiasm for HDR images, especially when the vast majority of displays are 8 bpc monitors. The use of an 8 bpc display for viewing HDR images encourages several interactive modes of viewing image media that are fundamentally different from static viewing experiences.

In one aspect, HDR image information (e.g., from an HDR image file or a set of lower dynamic range image files) is received which defines an HDR image. Region of interest information is received which defines one or more regions of the HDR image. A background image constructed from the HDR image information is displayed along with one or more portions of the HDR image corresponding to the one or more regions. The one or more portions are displayed in accordance with at least one display parameter (e.g., a tone mapping parameter) that differs from a corresponding display parameter for the background image. The region of interest information can be generated by a user via a graphical user interface (GUI), and display parameters can also be determined by a user. The background image and/or the portions corresponding to the regions of interest can be geometrically transformed. The background image can be blended with the portions of the image corresponding to the regions of interest, or borders can be more sharply defined. Display parameters can be adjusted in real time during display.

In another aspect, an intermediate image for the HDR image is determined based on image data in the one or more regions (e.g., corresponding to a rectangular region of interest or image segment) of the HDR image. The intermediate image is then displayed. The intermediate image has a narrower dynamic range (e.g., in terms of exposure levels, wavelengths, color saturation levels, etc.) than the HDR image. The HDR image information can be processed to yield processed image information, which can then be used to construct the intermediate image. Intermediate images can be, for example, tone-mapped or segmented versions of HDR images. (Segments can be used to help determine regions of interest in the HDR image.) Intermediate images can be stored in an image cache for quick retrieval.

One or more intermediate images can be displayed as part of a derived image comprising a background image and portions of the intermediate images defined by regions of interest at corresponding positions of the HDR image. The derived image can be used to compare, for example, different tone mappings, different compression methods, or different color spaces in the background and the regions of interest.

The various techniques and tools can be used in combination or independently. Different embodiments implement one or more of the described techniques and tools.

Additional features and advantages will be made apparent from the following detailed description of different embodiments that proceeds with reference to the accompanying drawings.

DETAILED DESCRIPTION

Techniques and tools for displaying/viewing high dynamic range (HDR) images on lower dynamic range displays are described. For example, a software tool referred to as an HDR viewer allows display of HDR images on lower dynamic range displays that are normally unable to take full advantage of the image information in HDR images (e.g., HDR images having more than 8 bits per channel (8 bpc) can be displayed on an 8 bpc display). The HDR viewer takes as input an HDR image, a set of images (e.g., a set of intermediate images having narrower dynamic ranges), or some combination. The HDR viewer displays a background image along with one or more regions of interest (e.g., regions of interest selected by a user). Display parameters serve as the basis for allowing the HDR viewer to choose one or more particular images to display for one more portions (defined by the selected regions of interest) of the original HDR image.

Input images can be pre-processed. For example, an original HDR image can be tone-mapped to create an intermediate image, reducing the dynamic range for a given display parameter (e.g., exposure level, color saturation, etc.). Original and/or tone-mapped Images can be cached for rapid retrieval during the viewing process.

The digital images described herein can be color, greyscale, or other types of images in a variety of formats. For example, although high dynamic range images are referred to herein as "HDR images", the high dynamic range images may in fact be in any of several possible image formats (e.g., GIF, PNG, BMP, TIF, JPG, JP2, HDR, and/or other formats). The digital images to be displayed can be captured by or stored on any device capable of capturing or storing digital images (e.g., digital cameras, scanners, digital camcorders, webcams, mass storage devices, flash memory cards, etc.).

I. Computing Environment

Figure 1:
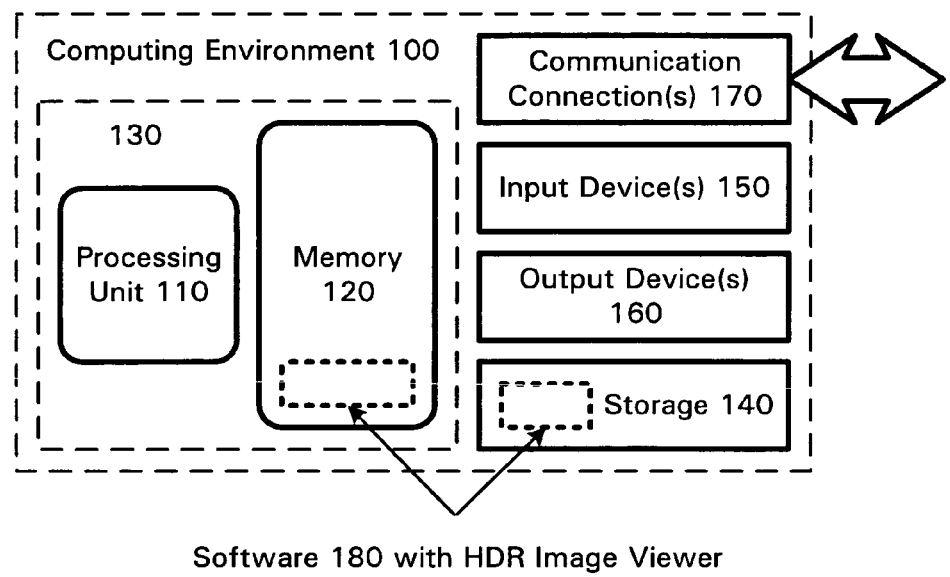
FIG. 1 is a block diagram of a suitable computing environment for implementing tools for viewing high dynamic range images.

FIG. 1 illustrates a generalized example of a suitable computing environment 100 in which the described techniques and tools may be implemented. The computing environment 100 is not intended to suggest any limitation as to scope of use or functionality of the invention, as the present invention may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing tools for displaying HDR images.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. The computing environment may include digital image processing hardware (e.g., a scanning device and/or digital camera) and/or digital image processing software.

The storage 140 may be removable or non-removable, and includes magnetic disks, magnetic tapes or cassettes, CD-ROMs, CD-RWs, DVDs, or any other medium which can be used to store information and which can be accessed within the computing environment 100. The storage 140 stores instructions for the software 180 implementing tools for displaying HDR images.

The input device(s) 150 may be a touch input device such as a keyboard, mouse, pen, or trackball, a voice input device, a scanning device, a digital camera, or another device that provides input to the computing environment 100. The output device(s) 160 desirably include a display and may also include a printer, speaker, or another device that provides output from the computing environment 100.

The communication connection(s) 170 enable communication over a communication medium to another computing entity. The communication medium conveys information such as computer-executable instructions, digital image information, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment 100, computer-readable media include memory 120, storage 140, communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, when describing computer operations in a computing environment, the detailed description uses terms like "determine," "choose," and "select." Such terms, when applied to computer operations in a computing environment, are high-level abstractions. The actual computer operations corresponding to these terms vary depending on implementation.

II. High Dynamic Range Image Viewing

Described techniques and tools involve different aspects of displaying/viewing HDR images. For example, described tools include "HDR viewers" useful for displaying HDR images (e.g., on lower dynamic range displays).

HDR viewers described herein allow one or more specific regions of interest in an HDR image to be selected (e.g., by a user) and displayed. In the regions of interest, an HDR viewer displays the corresponding portion or portions of the HDR image. The corresponding portion or portions vary in some way from the original HDR image. For example, a portion of an HDR image corresponding to a region of interest can be tone-mapped, thereby narrowing the dynamic range of that portion of the HDR image. Those parts of the image outside of all regions of interest can be referred to as the default region. The image as displayed in the default region can be referred to as the background image.

Tone mapping can be applied to HDR images for different purposes. For example, tone-mapping can involve mapping exposure levels in the corresponding portion to a narrower dynamic range for display on an 8 bpc monitor that it is not capable of displaying a 12 bpc HDR image in its full dynamic range. In this way, tone mapping can be used to create an intermediate image with a narrower dynamic range. Examples of tone-mapped intermediate images include, without limitation, the following:

A series of tone-mapped images from a single input HDR image.

A series of tone-mapped images from a set of input images, the set of input images having varying dynamic ranges.

A series of images which are some interpolation or extrapolation of original input images and/or tone-mapped input images.

The phrase "tone mapping" is used generically herein to represent either a global or a local tone mapping. A global tone map refers to a function, g, which maps a color value, c, to a color value, g(c). Global tone mapping is the process of applying a global tone map to each of the colors in a given image, I. For example, a global tone map can be applied to an image to modify the brightness and/or contrast qualities of the image as desired by a user, resulting in a tone-mapped image G(I). Global tone mapping can have a variety of parameters. Often, a global tone map includes a value to which "middle gray" is mapped. Middle gray represents the mean or median brightness represented in the image. Local tone mapping refers to a function, L, which transforms an entire image, I, to a tone-mapped image L(I). As with global tone mapping, a local tone map can be applied to an image with the goal of adjusting brightness and contrast in the image. However, a local tone map can allow for local adjustments which may not be uniformly applied across the image. General tone mapping concepts are well understood by those skilled in the art and will not be described further.

Figure 2:
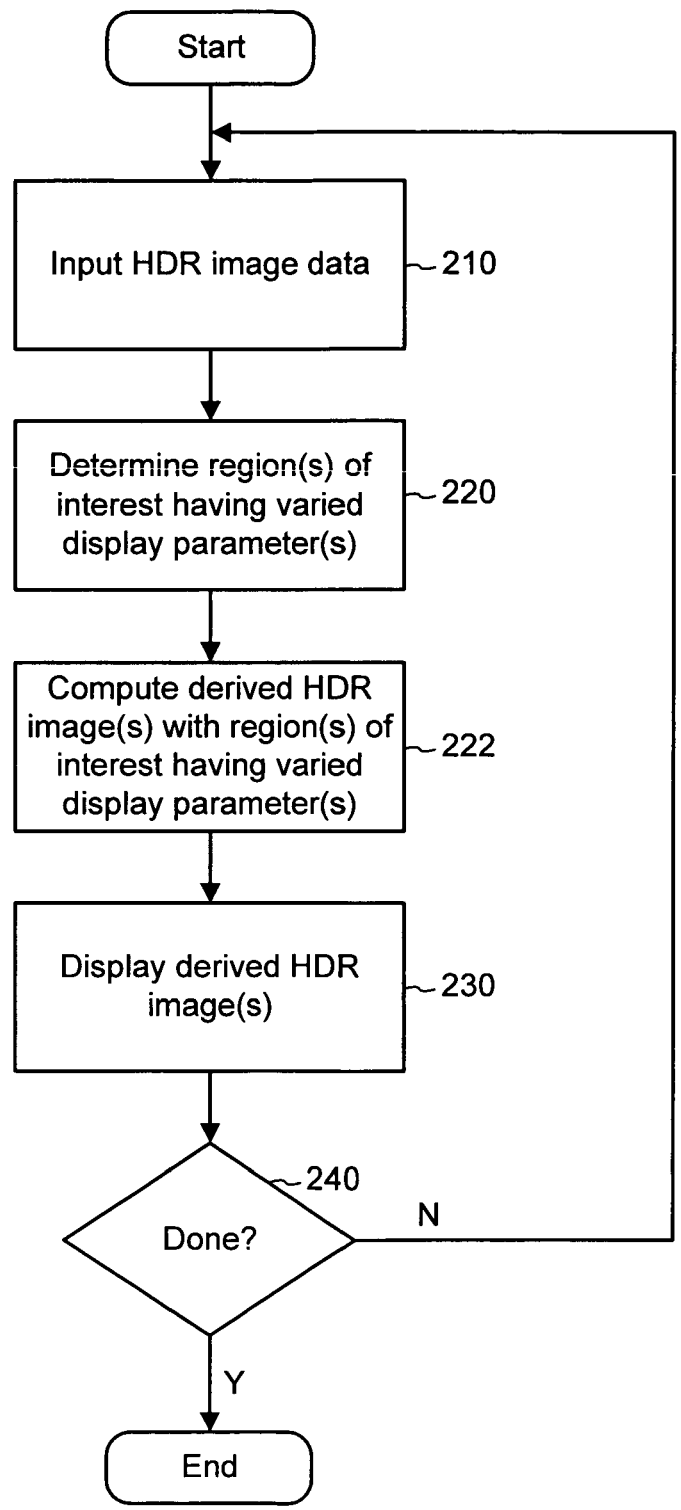
FIG. 2 is a flow chart illustrating a technique for displaying a high dynamic range image with a region of interest having a varied display parameter.

FIG. 2 is a flow chart illustrating a technique 200 for displaying a high dynamic range image with one or more regions of interest having one or more varied display parameters. At 210, an HDR viewer takes HDR image data as input. At 220, one or more regions of interest are determined (e.g., by a user) for the HDR image. The one or more regions of interest have at least one varied display parameter (e.g., exposure levels, color saturation levels, etc.) for the corresponding portion of the image. Then, at 222, a derived HDR image is constructed. The derived image may show the regions of interest differently than the remainder of the image. For example, the regions of interest can have tone-mapped exposure levels such that their dynamic range is expanded to fill the dynamic range of the display, while the background image has a dynamic range that is compressed to the display's dynamic range. At 230, the derived HDR image with the one or more regions of interest is displayed to the user (e.g., on an 8 bpc monitor, where the HDR image has greater than 8 bits of exposure information per channel.) More than one HDR image could be derived and/or displayed simultaneously.

These actions can be repeated indefinitely. A user can repeatedly change display parameters and/or select new images for input, and the HDR viewer can construct and display new images based on the chosen parameters. For example, if display of HDR images is done (240) after displaying one or more derived HDR images (230), the process ends. However, if a user wishes to repeat the process, the user can do so and can change display parameters, select new images for input, change the number and/or configuration of regions of interest, etc. Alternatively, the process can be automatically repeated without user input, with or without variation from the previous iteration of the process.

Although the exemplary HDR image viewing process illustrated in FIG. 2 includes construction of one or more derived HDR images, construction of derived HDR images is optional. For example, rather than constructing a derived HDR image for display, an HDR image viewer can select (or enable a user to select) an intermediate image for display, based on a region of interest. In such a scenario, a user can select, for example, a region of interest in a darker portion of a background image, and the HDR viewer can display a tone-mapped intermediate image having a brighter exposure level to reveal detail in the user-selected region of interest.

Furthermore, a derived HDR image can be virtual: Although a derived HDR image exists in its displayed form in graphics memory, the derived HDR image is not necessarily stored on disk or within host memory in the form in which it is displayed.

Figure 3:
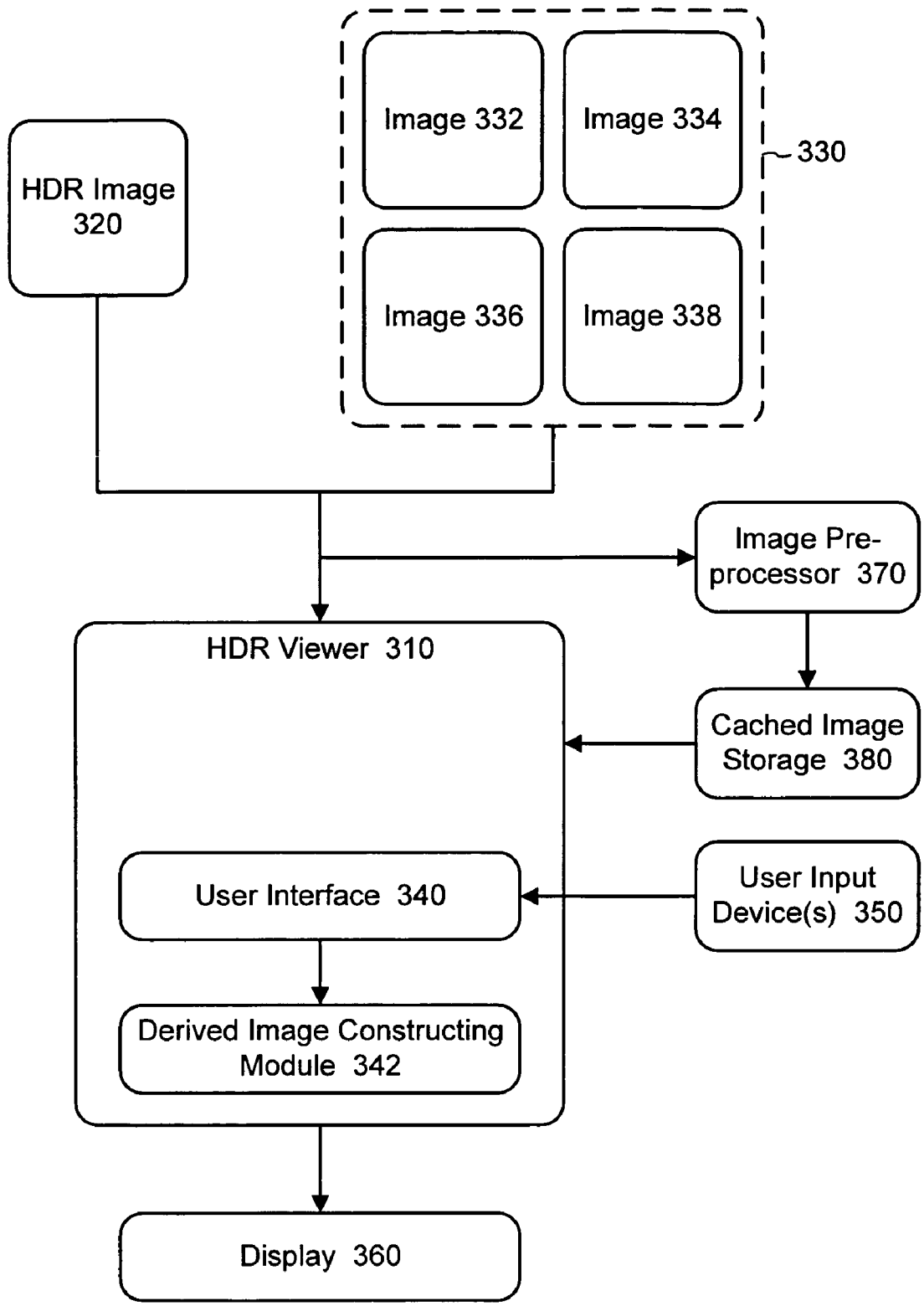
FIG. 3 is a block diagram illustrating an exemplary high dynamic range image viewing system.

FIG. 3 is a block diagram illustrating an exemplary arrangement comprising an HDR viewer 310. FIG. 3 shows examples of different kinds of input that HDR viewer 310 can accept. For example, FIG. 3 shows HDR image 320 and a set 330 of lower dynamic range intermediate images 332, 334, 336 and 338 having different dynamic ranges (e.g., different exposure ranges). In general, the input to an HDR viewer can be either a single HDR image, a set of images (e.g., a set of images having varying dynamic ranges used to construct an HDR image), or some combination. As shown in FIG. 3, HDR viewer 310 can accept as input either HDR image 320, image set 330, or a combination.

Once HDR viewer 310 has accepted image input, a user can perform operations on the HDR viewer via user interface 340 and one or more user input devices 350 (e.g., a mouse, optical tracking device, keyboard, microphone, eye-tracking device, or some other device.) The user interface allows a user to perform certain operations on and set display parameters for HDR images. A new derived image or constructed image (including one or more regions of interest) is then constructed by the derived-image constructing module 342. The derived image can then be displayed to the user via display 360.

Although the exemplary HDR viewer 310 includes a derived-image constructing module 342, as explained above with reference to FIG. 2 construction of derived HDR images is optional. For example, a user can select a region of interest in a background image, and the HDR viewer can display an intermediate image (rather than constructing a derived HDR image) that reveals detail in the user-selected region of interest.

A. Display Parameters

An HDR viewer uses display parameters to prepare an image for display. There are a number of display parameters which can be modified in real time or preset prior to display. For example, referring again to FIG. 3, a user can set display parameters for the image input via the user interface 340 prior to display or in real time during display. Alternatively, one or more display parameters can be fixed and/or automatically adjusted by the HDR viewer for a given display session. Possible display parameters include, but are not limited to, the following:

Parameters for determining the number of regions of interest.
Parameters for determining the sizes and shapes of each region of interest, possibly determined with the aid of image pre-processing (e.g., through image segmentation).
Parameters to scale, translate, rotate, shear, or otherwise geometrically transform the entire image.
Parameters to scale, translate, rotate, shear, or otherwise geometrically transform the regions of interest.
Parameters for tone-mapping regions of interest.
Parameters for determining what should be displayed in the default region.
Parameters for determining which of the cached images (if any) to associate with each region of interest.
Parameters for determining how what is shown in the regions of interest are combined with the background image. For example, a parameter could determine whether the borders of a region of interest should be blended with the background or sharply defined.

In some HDR viewers, display parameters listed here can be modified or omitted, and/or other parameters beyond those listed here can be added.

B. Image Pre-processing and Caching

Although HDR viewer 310 can accept image information (e.g., HDR images, sets of lower dynamic range intermediate images) and display images without pre-processing, image information also can be pre-processed (e.g., in image pre-processor 370) and/or cached for quick retrieval (e.g., in cached image storage 380).

In addition to tone-mapping, other forms of image pre-processing can be performed. For example, an image can be segmented during pre-processing using known image segmentation techniques. Segmented images can be used to help determine regions of interest. Alternatively, edge-detection and contour mapping can allow users to select complex shapes which are aligned with edges in the image. As another example, local brightness in an image can be detected to determine possible regions of interest during pre-processing.

Figure 4:
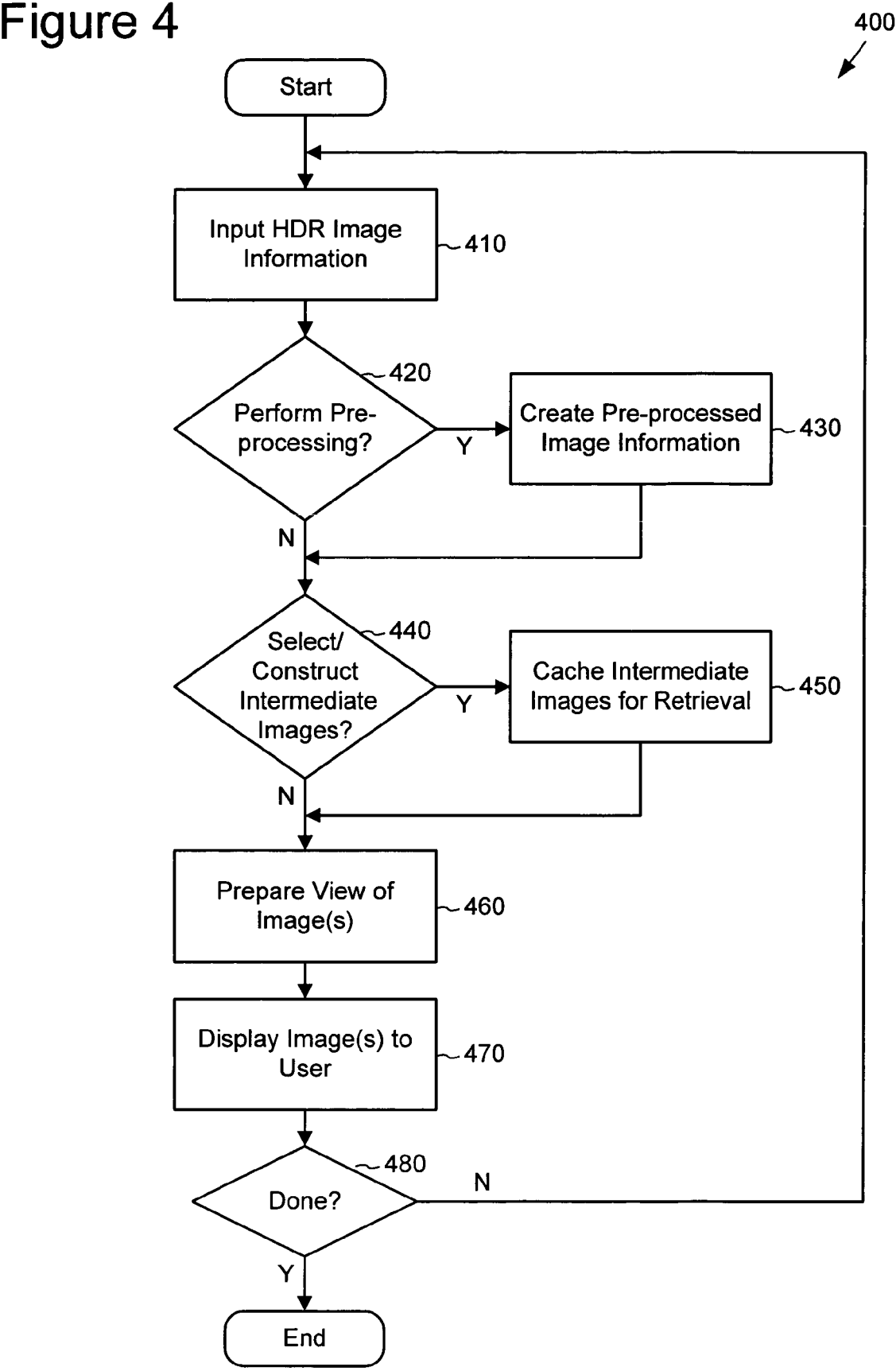
FIG. 4 is a flow chart illustrating a technique for displaying a high dynamic range image with image pre-processing and/or image caching.

FIG. 4 is a flow chart illustrating an exemplary technique 400 for displaying a high dynamic range image with optional image pre-processing and/or image caching. At 410, an HDR viewer takes HDR image information (e.g., an HDR image, a set of lower dynamic range intermediate images, etc.) as input. At 420, a determination is made whether to perform pre-processing on any of the input image information. If pre-processing is performed then pre-processed image information is created at 430.

At 440, a determination is made whether to select existing intermediate images that have not been pre-processed (e.g., lower dynamic range images that have been taken as input) and/or to construct intermediate images from pre-processed image information. Intermediate images are cached for quick retrieval at 450. Cached images can be stored in RAM or in the file system of a computer, or in any other form of temporary or permanent memory. Cached images can be original input images or pre-processed images.

At 460, the view of the HDR image is prepared. Such preparation can include construction of a derived HDR image (e.g., showing a background image with one or more regions of interest having varied display parameters). Or, as another example, an HDR viewer can select (or enable a user to select) a cached intermediate image for display without constructing a derived HDR image. At 470, the prepared image is displayed to the user. More than one image could be prepared and/or displayed simultaneously.

These actions can be repeated indefinitely. A user can repeatedly change display parameters and/or select new images for input, and the HDR viewer can construct and display new images based on the chosen parameters. For example, at 480 if display of HDR images is done, the process ends. However, if a user wishes to repeat the process, the user can do so and can change display parameters, omit or change pre-processing, select new images for input, change the number and/or configuration of regions of interest, etc. Alternatively, the process can be automatically repeated without user input, with or without variation from the previous iteration of the process.

III. EXAMPLES

The following are examples of different HDR viewers. The invention is not limited to these examples.

A. Rectangle Viewer

A rectangle viewer takes as input a single HDR image. A globally tone-mapped version of the input image is cached. The cached image is the background image in the default region. A single rectangle is positioned by the user, revealing a tone-mapped version of the portion of the image that is within the user-positioned rectangle. The user-positioned rectangle defines a region of interest. The tone mapping applied to the region of interest is different from the tone mapping applied to the background image in that it attempts to expand the dynamic range of only the user-positioned rectangle fully into the display's dynamic range. The final view shows the entire derived HDR image.

Figure 5:
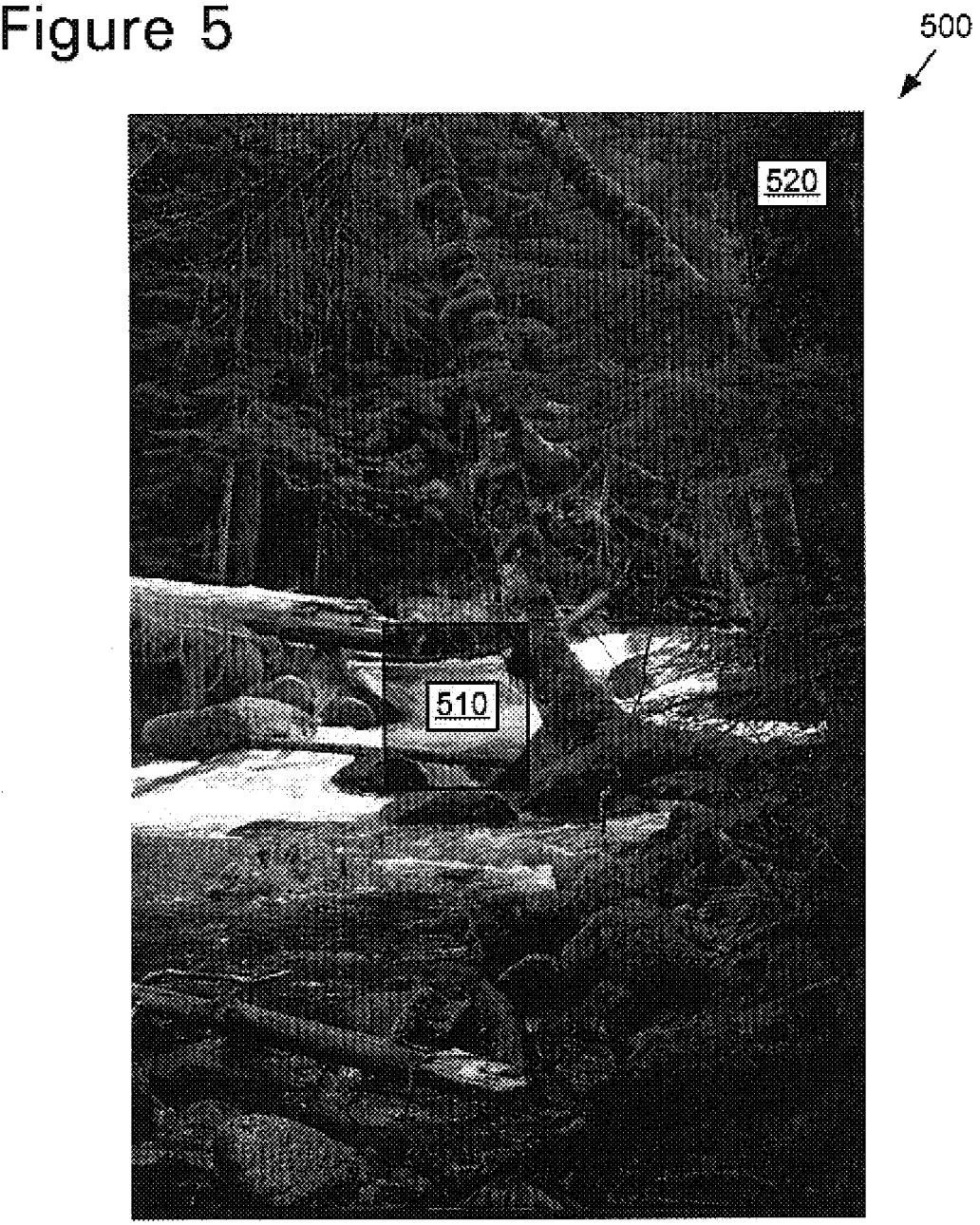
FIG. 5 is an illustration of a user interface for a high dynamic range image rectangle viewer.

FIG. 5 shows a screen shot of an exemplary rectangle viewer. In FIG. 5, the final image view 500 comprises a rectangular region of interest 510 within a background image 520. The rectangle viewer allows a user to "peek" into different portions of the image in a way that best exposes the portion of the HDR image within the rectangular region of interest. For example, in FIG. 5, the tone mapping applied to rectangular region of interest 510 results in a darker exposure level than the background image 520, revealing details in the whitewater of the stream that may otherwise be washed out at a brighter exposure level.

The cached image can be adjusted (e.g., by performing additional brightening or darkening, depending on the selected region of interest) to heighten the "pop-out" or contrast effect when viewing the rectangular region of interest. Additional, optional features include allowing keyboard key (e.g., arrow key) presses to be used to raise or lower the middle-gray value of the tone-mapping applied to the rectangle, to the background image, etc. The rectangle dimensions can be adjusted by the user (e.g., by performing a click-hold-and-drag mouse operation on a corner of the rectangle).

B. Sliding-window Viewer

The sliding-window viewer is similar to the rectangle viewer. In the sliding-window viewer, a user drags or slides a fixed-size rectangle around the background image. The effect is similar to the rectangle viewer. It is possible to introduce a Gaussian kernel, with diagonal variances proportional to the rectangle dimensions, which determines a coefficient with which to blend the image in the region of interest and the background interest. This would eliminate the step change at the boundaries of the rectangle of interest.

C. Segment Viewer

The segment viewer is similar to the sliding-window viewer and the rectangle viewer. However, in the segment viewer, the regions of interest are segments computed using image segmentation techniques. A user can choose segments by passing a cursor over portions of the image. As the cursor passes over a segment, the segment viewer applies tone mapping to the segment, separate from any tone mapping applied to the background image. A user can toggle (e.g., with a mouse or keyboard operation) tone mapping so that multiple segments can be viewed in their tone-mapped state at once. The segment viewer can be used in image editing applications (e.g., in scenarios where a user would like to apply segment-dependent tone maps to an image).

D. Split-pane viewer

A split-pane viewer allows a user to view up to four different versions of the same image simultaneously in a viewing window. The different versions can be of different dimensions or aspect ratios. The window area is divided to show different areas of the image versions. The window split position can be moved (e.g., by clicking and dragging with a mouse). During viewing, a user can choose to switch between a split view and a full image view where one version of the image can be viewed in its entirety. The viewer allows a user to perform other functions on the image or images such as zoom, color adjustment, repositioning within the window, etc.

For example, a split-pane viewer can take four input images where the first three are images of the same scene taken with varying exposure, and the last is a single tone-mapped version of the HDR image constructed from the first three images. All of these images are cached in RAM. The final view is constructed by showing a zoomed-in region of the entire image split into four rectangular panes, laid out 2 by 2, with each pane showing one of the four cached images.

Figure 6:
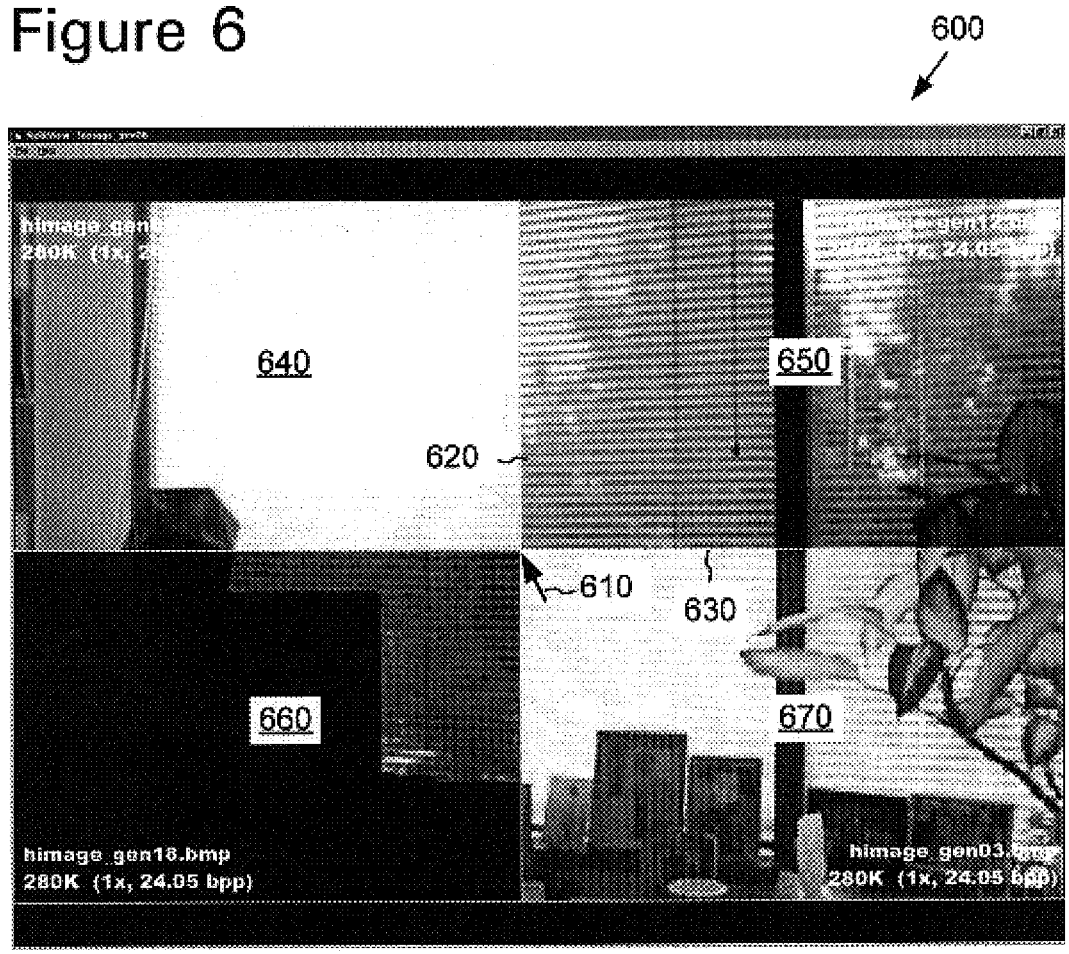
FIG. 6 is an illustration of a user interface for a high dynamic range image split-pane viewer.

FIG. 6 is an illustration of an exemplary user interface for a split-pane viewer. The user instructs the split-pane viewer (e.g., by a mouse click) to create up to a four-pane arrangement for an HDR image. Within an application window 600, a user positions a mouse cursor 610 at a desired intersection point. Dividing lines 620 and 630 intersect at the user-selected intersection point (indicated in FIG. 6 by the position of mouse cursor 610) and divide the image viewing area into four panes 640, 650, 660 and 670. In this example, pane 640 reveals a portion of a tone-mapped image having the highest level of exposure relative to the other three panes. Panes 670, 640, and 660 reveal portions of tone-mapped images that are progressively less exposed.

The user can modify some parameters "on the fly": By dragging the center point of the panes 640, 650, 660 and 670, the user can change the relative sizes and aspect ratios of the four panes; by use of keyboard or additional mouse controls, such as a scroll wheel and secondary buttons (not shown), the user can zoom in or out on any portion of the collection of images, showing more or less detail, but still maintaining the simultaneous display of up to four different versions of the image; through navigation buttons (not shown) or by keyboard input, etc., the viewer can translate the image left, right, up, or down. The effect on the user is to be able to see a single image fragmented into up to four panes, each of which show the image under different conditions, such as different exposure settings. The operations described in this example can also be applied to display two or three different image conditions (e.g., in a two-pane or three-pane configuration). In this way, the user can view details in the HDR image that may not otherwise be visible on a lower dynamic range display.

IV. EXTENSIONS

HDR viewers can be used to compare different kinds of dynamic ranges. In addition to exposure level ranges, HDR viewers can be used to compare color saturation ranges, wavelength ranges, or other kinds of dynamic ranges. HDR viewers can also be used to compare images with different compression methods, color spaces (e.g., color vs. grayscale), etc.

HDR viewers can introduce a delay in the response between when the user changes a parameter and the final image that is displayed. This delay may be mediated by images which are interpolations of the old image and the new image to be shown.

HDR viewers can be applied to video or to virtual 3D environments.

HDR viewers can be used in conjunction with other digital image processing techniques and tools. For example, HDR viewers can be used in a digital photo editing scenario to edit photographs on a computer when there is a need to examine an HDR image mapped into one or more narrowed dynamic ranges. HDR viewers can allow a user to edit an image manually by changing tone-mapping parameters in different parts of an HDR image.

Target display parameters can be used. With target display parameters, an HDR viewer can create a fading or blending effect by, for example, setting a target parameter at a pixel location in a region of interest, and blending a border area between a background image and the region of interest to the location where the target parameter is set.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system, a method of displaying one or more digital high dynamic range images, the method comprising:

receiving high dynamic range image information for a high dynamic range image;

deriving image segment information from the high dynamic range image information during pre-processing of the high dynamic range image, the image segment information defining two or more image segments in the high dynamic range image; and in response to a cursor passing over a first image segment of the two or more image segments in the high dynamic range image:

applying tone mapping to the first image segment; and displaying the first image segment in accordance with at least one display parameter corresponding to the tone mapping that differs from a corresponding display parameter for a second image segment of the two or more image segments in the high dynamic range image.

2. The method of claim 1 wherein the first image segment and the second image segment include information from different image files.

3. The method of claim 1 wherein the displayed first image segment is blended with the second image segment.

4. The method of claim 1 wherein the displaying the first image segment in accordance with at the least one display parameter corresponding to the tone mapping is performed on a display having a lower dynamic range than the high dynamic range image.

5. In a computer system, a method of displaying one or more digital high dynamic range images, the method comprising:

accepting image information of the one or more digital high dynamic range images from a high dynamic range image source;

as a pre-process, segmenting the one or more digital high dynamic range images into two or more image segments;

caching the image information for retrieval;

displaying an image on a display device composed from the cached image information, the displayed image containing at least two of the image segments;

receiving input indicative of a cursor passing over a first image segment of the at least two of the image segments in the displayed image;

in response to the input:

applying tone mapping to the first image segment, wherein the tone mapping is applied in accordance with at least one tone mapping display parameter that differs from a corresponding display parameter for a second image segment of the at least two of the image segments in the displayed image; and refreshing display of the image on the display device with the first image segment as modified by the tone mapping.

* * * * *